(12) United States Patent  (10) Patent No.: US 9,093,115 B1
Fung et al.  (45) Date of Patent: Jul. 28, 2015

(54) TRACK INTERFERENCE CANCELLATION

(71) Applicant: Seagate Technology LLC, Cupertino, CA (US)

(72) Inventors: Kendall Hayne Fung, Longmont, CO (US); David H. Dahlem, Jr., Longmont, CO (US); Raman Chatapuram Vankataramani, Longmont, CO (US); Belkacem Derras, Longmont, CO (US); William Michael Radich, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/471,703

(22) Filed: Aug. 28, 2014

Related U.S. Application Data

(62) Division of application No. 13/844,001, filed on Mar. 15, 2013, now abandoned.

(51) Int. Cl.
*G11B 21/02* (2006.01)
*G11B 27/36* (2006.01)
*G11B 20/10* (2006.01)
*G11B 5/09* (2006.01)

(52) U.S. Cl.
CPC ............ *G11B 20/10046* (2013.01); *G11B 5/09* (2013.01)

(58) Field of Classification Search
None
See application file for complete search history.

(56) References Cited

U.S. PATENT DOCUMENTS

2012/0105994 A1  5/2012  Bellorado et al.

OTHER PUBLICATIONS

Aviran et al., "Noise-Predictive Turbo Equalization for Partial-Response Channels" Oct. 2005, IEEE Transactions on Magnetics, 3 pages.

*Primary Examiner* — Regina N Holder
(74) *Attorney, Agent, or Firm* — HolzerIPLaw, PC

(57) ABSTRACT

A system can include a first buffer storing a first fragment of data for a first data sector in a first track of a storage medium, a second buffer storing a second fragment of data for a second data sector in a second track of the storage medium adjacent to the first track, a processor configured to determine an estimated region of overlap between the first data fragment and the second data fragment, and a circuit configured to refine the estimated region of overlap by determining an offset value to offset an estimated beginning portion of overlap by the second fragment.

20 Claims, 8 Drawing Sheets

TRACK INTERFERENCE CANCELLATION

CROSS-REFERENCE TO RELATED APPLICATION

This application is a divisional application of U.S. patent application Ser. No. 13/844,001 filed Mar. 15, 2013, the entire contents of which are incorporated herein by reference.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

In accordance with one embodiment, a method may be utilized that comprises determining a starting position and length for a first data fragment, wherein the first data fragment is located in a first track of a magnetic recording medium; determining a starting position and a length for a second data fragment, wherein the second data fragment is located in a second track of a magnetic recording medium; determining adjacent coextensive portions of the first data fragment and the second data fragment; and reading the adjacent coextensive portions of the first data fragment and the second data fragment.

These and various other features and advantages will be apparent from a reading of the following detailed description.

BRIEF DESCRIPTION OF THE DRAWINGS

A further understanding of the nature and advantages of the present technology may be realized by reference to the figures, which are described in the remaining portion of the specification.

DETAILED DESCRIPTION

Embodiments of the present technology are disclosed herein in the context of a disc drive system. However, it should be understood that the technology is not limited to a disc drive system and could readily be applied to other technology systems as well.

When data signals are read from storage devices, the data intended to be read can sometimes be corrupted or difficult to detect due to interference from neighboring storage areas. The reading of data from one track can be difficult because the neighboring tracks can corrupt or interfere with the stored data being read.

Figure 1:
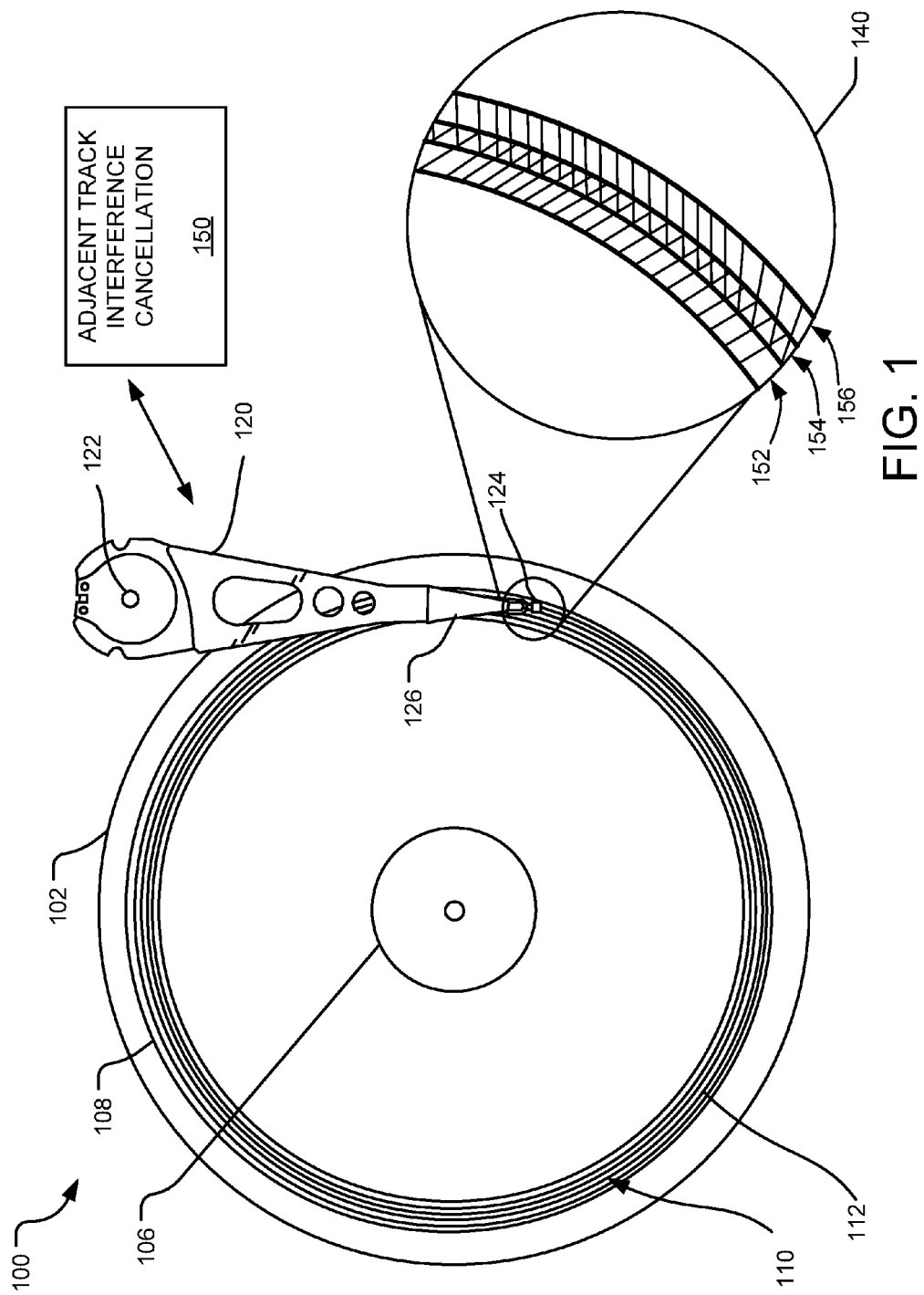
FIG. 1 illustrates an example disc drive system showing overlapping track data that can be corrected utilizing adjacent track interference cancellation in accordance with one embodiment.

FIG. 1 illustrates a perspective view 100 of an example disc drive system. A disc 102 includes an inner diameter 106 and an outer diameter 108 between which are a number of concentric data tracks 110, illustrated by circular dashed lines.

Information may be written to and read from the data tracks 110 on the disc. A transducer head 124 is mounted on an actuator assembly 120 at an end distal to an actuator axis of rotation 122. The transducer head 124 flies in above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

The exploded view 140 illustrates two overlapping tracks. A first track 152 is shown with hatched shading. A second track 156 is shown with hatching in the opposite orientation. The region 154 shows an area where the two tracks have overlapped.

Block 150 in FIG. 1 is utilized to cancel interference from adjacent tracks. Block 150 is particularly useful in canceling interference when the interfering data on adjacent tracks does not occur in a regularly formatted manner.

As the density of stored data on storage devices increases, data bits are stored in closer and closer proximity to one another. This is sometimes referred to as increasing areal density. While increased areal density allows more data to be stored on a magnetic medium, it can make it more difficult to read data from such a device. In the context of disc drive technology, areal density can lead to overlapping tracks of data. For example, after one track of data is stored on the magnetic medium, a second track of data can be stored adjacent to that track. Sometimes, the second track can be written so that it actually encroaches on the first track by slightly overlapping the first track. If the overlap is significant enough, the data value previously written onto the first track may no longer be discernible. Rather, a corrupted data value(s) may be created on the first track. In some cases, the mere close proximity of the second track to the first track can influence the values read from the first track. Thus, the second track can sometimes affect the first track without overlapping the first track in some instances.

In accordance with one embodiment, a method and apparatus are provided that permit the cancellation of interfering signals from adjacent tracks. This can be referred to, for example, as adjacent track interference cancellation.

Corrupted data values may be recovered in accordance with one embodiment by sampling the original values stored on a first track and reading the binary values stored to a second track that is adjacent to the first track. The interfering value from the second track may then be input to a filter before being cancelled from an equalized sample of the first track. However, one first determines with some particularity where these encroaching (e.g., overlapping) regions of the first and second tracks occur. Such a determination can be a difficult task in and of itself.

In accordance with one embodiment, one can utilize two determinations to determine where overlapping data occurs. A first determination of overlapping regions can be referred to as a "coarse" determination of overlapping regions. A second determination can be referred to as a "fine" alignment estimation.

The coarse determination allows one to take into account that data is often not stored as complete sectors of data sequences. Rather, data fragments are often stored throughout sectors of a track. Such data fragments may be of different lengths and spread across different sectors of a track.

Figure 2:
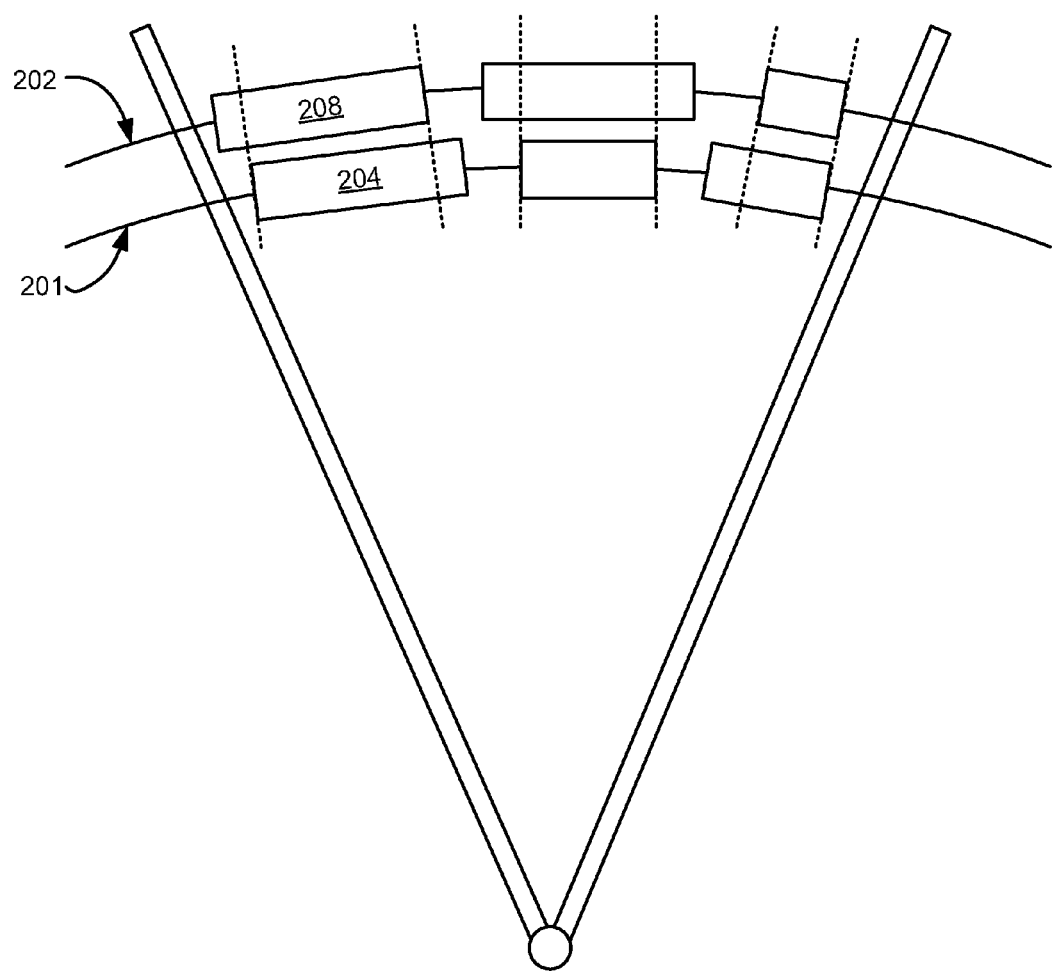
FIG. 2 illustrates an example of data fragments stored on adjacent tracks of a magnetic medium that can be corrected utilizing adjacent track interference cancellation in accordance with one embodiment.

Similarly, adjacent tracks also store data as data fragments. Two adjacent tracks may overlap one another where fragments of data occur proximate one another but on different tracks. An example of this can be seen in FIG. 2. In FIG. 2, a wedge "W" of data tracks is shown. The data on the innermost track 201 is shown as three data fragments within a first sector of data. The data on the outermost track 202 is shown as two long fragments of data and a third smaller fragment of data. As can be seen, adjacent fragments on the two tracks occurs at certain points where data fragments on the first track are adjacent and coextensive with data fragments on the second track. The dashed lines in FIG. 2 demarcate the adjacent coextensive regions where data could encroach upon a neighboring track by overlapping the adjacent track during a write operation.

Some of the factors that make it difficult to correct interference caused by adjacent tracks are that (1) in the real world data fragments are not perfectly aligned and located at regular intervals, (2) data fragments do not occur in regular lengths, and (3) data fragments do not necessarily begin at the beginning of a sector. In addition, irregularities in the storage of data in the downtrack direction in a particular track can make the cancellation of interference difficult. For example, different write operations can be made when the disc drive is operating at a different speed or under different power conditions. This can lead to frequency and phase errors in the writing of data to a track in the downtrack direction. Moreover, when a read head is used to read data from a track, the read head can vary in its position in the crosstrack direction to some degree. Thus, if the read head is not centered over the middle of the track, the read head might not be reading the strongest signal from a bit location. This irregularity in reading data can make the process of cancelling interfering data more difficult.

To account for some of these issues, a coarse determination is first performed in accordance with one embodiment. The coarse determination allows one to determine where adjacent track data occurs for two tracks. A data formatter stores the location of the beginning of each fragment of data stored on a track. Similarly, the formatter may also store the length of each data fragment. In accordance with one embodiment, this information may be utilized to make a coarse determination of overlapping regions for two tracks. One determines where overlapping occurs so that the cancellation procedure discussed below can be implemented for data on adjacent tracks.

A data formatter may be programmed (1) to record where a data fragment begins in a track relative to a reference position and (2) to record the length of the data fragment. This effectively allows one to determine a beginning position of the data fragment and an ending position of the data fragment. One way to accomplish this is to index the beginning position of a data fragment from the beginning position of a sector of a track, wherein each track is divided into multiple sectors.

Referring to FIG. 2, for example, data fragment 204 in track 201 may begin 100 bits from the beginning of the sector. The data fragment may have a length of 2.5K. Similarly, data fragment 208 in the adjacent track 202 may begin 50 bits from the beginning of its sector and have a length of 2K. Thus, the overlapping regions occur roughly from Index+100 through Index+50+2K. The term "Index" is used to give the beginning position of the sectors as a reference point. FIG. 2 further represents in accordance with one embodiment that data for data correction can be retrieved from adjacent portions of two tracks that are not in a formatted alignment so that interference caused by one track encroaching on the other may be corrected.

Figure 3:
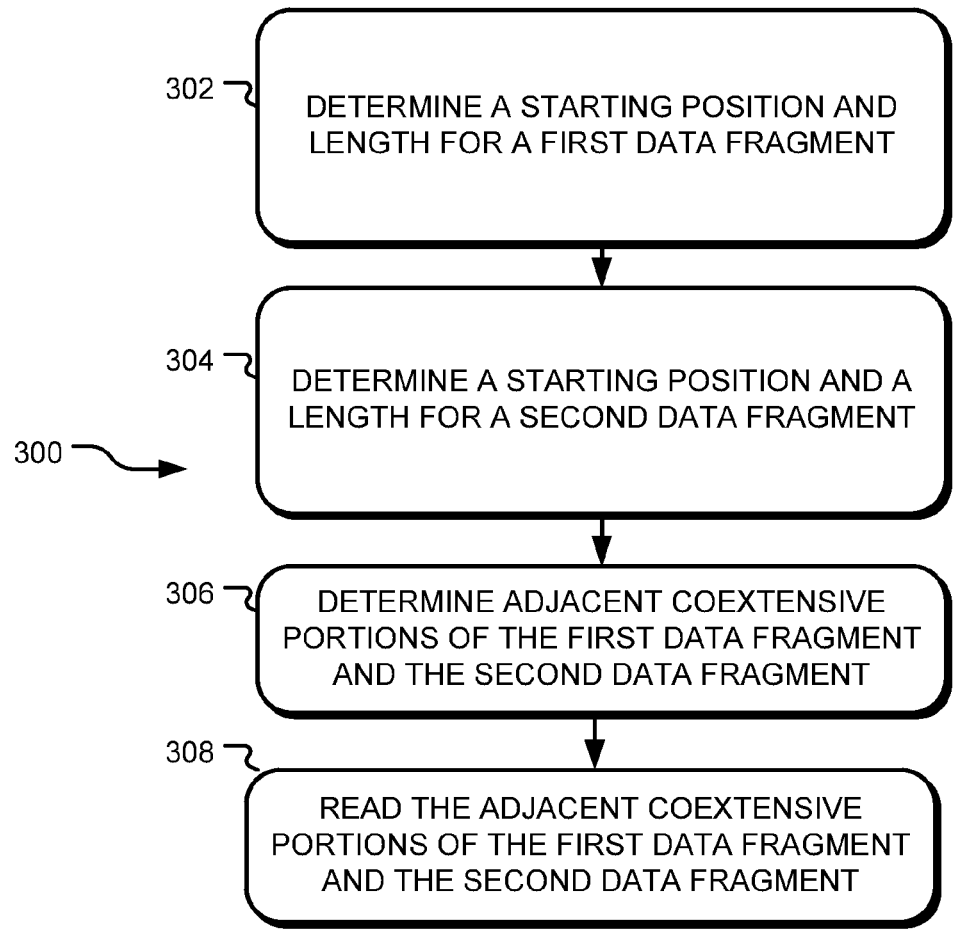
FIG. 3 shows a flow chart that illustrates a method of determining a coarse alignment of overlapping data fragments in adjacent data tracks, in accordance with one embodiment.
Figure 4:
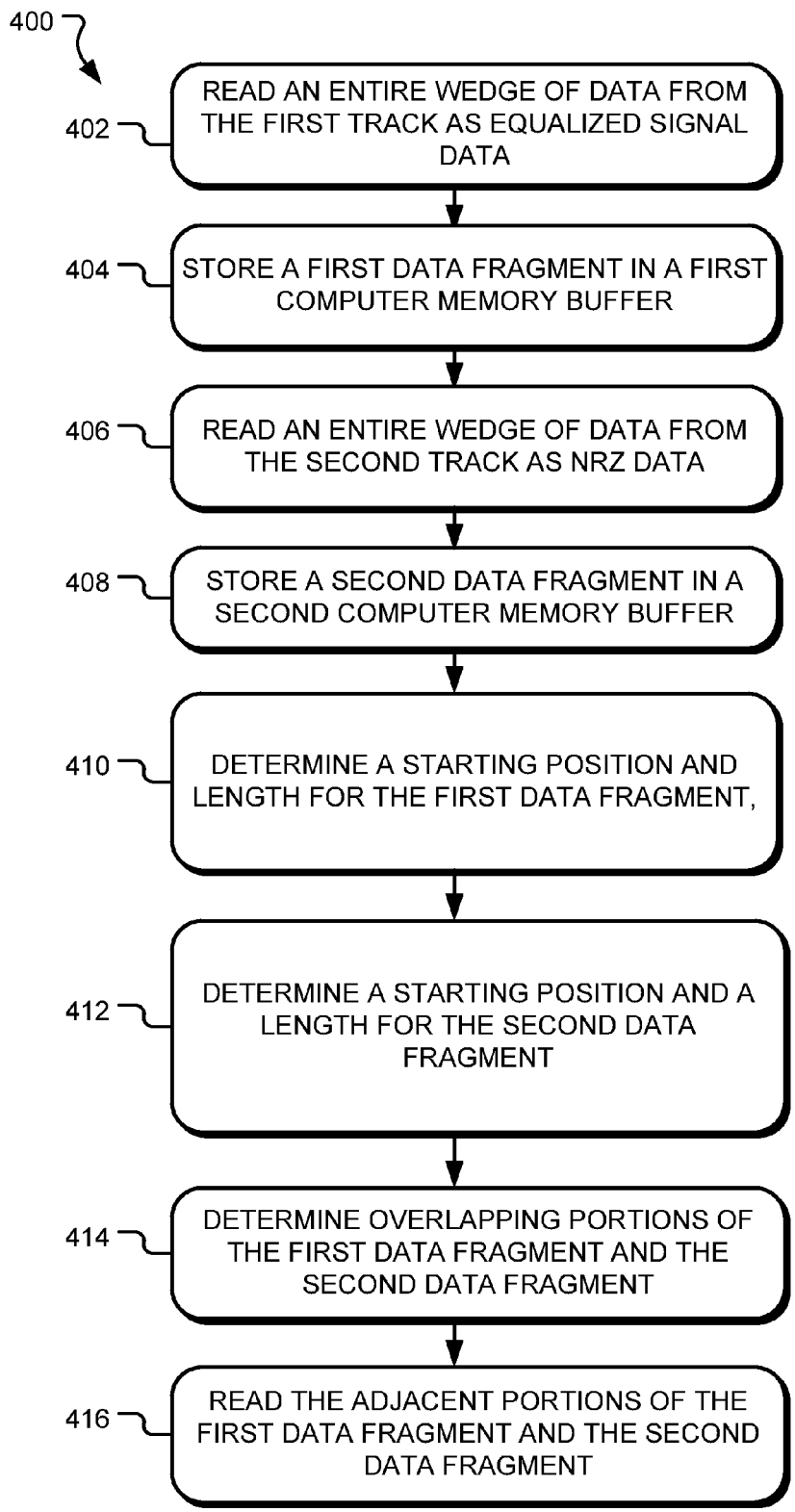
FIG. 4 shows a more detailed example of a flow chart that illustrates a method of determining coarse alignment, in accordance with one embodiment.

The flow charts in FIGS. 3 and 4 illustrate further examples of this. In operation block 302 of flow chart 300, one may determine a starting position and length for a first data fragment. The first data fragment is located on a first track of a recording medium. In block 304, a starting position and length for a second data fragment may be determined. The second data fragment is located in a second track of the recording medium. In operation block 306, adjacent coextensive portions of the first data fragment and the second data fragment may be determined. Once the adjacent coextensive portions of the first data fragment on the first track and the second data fragment on the second track have been identified, one may read and utilize the adjacent coextensive values stored on each respective track. The values are considered adjacent in that the values are near one another or overlap one another. The values are considered coextensive in that they have portions that are aligned in the circumferential direction.

Referring now to FIG. 4, another example is illustrated as flow chart 400. In operation block 402, an entire wedge of data may be read for a first track. For example, multiple sectors of data can be read for the first track. The first track can also be referred to as the main track in this example. Because in this example the data on the first track is considered potentially corrupted due to interference from the adjacent track, one may not be able to discern a non-return-to-zero (NRZ) value for each data bit on the main track. Rather, one may instead need to sample the data on the main track and store an equalized signal value for each bit position. The data values for this wedge of data may be stored in a first computer memory buffer. As shown in operation block 404, part of the wedge of data may include a first data fragment.

In operation block 406, the data from a neighboring track may be read. It is assumed for purposes of this example that the data for this neighboring track was written to the neighboring track after the data for the main track was written to the main track. Thus, the data for the neighboring track may overlap part of the main track and corrupt the main track's values. The data values for the wedge of data on the neighboring track may be stored in a second memory buffer. As noted in block 408, part of this wedge of data may include a second data fragment.

Operation block 410 shows that a device such as a microprocessor or data formatter may determine a starting position for the first data fragment. Again, the first data fragment is understood to be stored on the first data track. Operation block 412 similarly shows that a starting position and length for the second data fragment may be determined by the microprocessor or data formatter. The second data fragment is stored on the second track of the magnetic recording medium. Based on these coarse positions noted for the first and second data fragments, one may determine overlapping portions of the first and second data fragments, as shown by block 414.

Once the boundaries of the overlapping data fragments are known, one may perform subsequent operations to fine tune the overlap determination and to cancel any interference. Thus, block 416 shows that the adjacent portions of the first data fragment and the second data fragment may be read, e.g., read from the buffers or read again from their respective tracks.

As noted above, the initial overlap determination is considered a "coarse" overlap determination. This is because that initial determination does not necessarily create a precise determination of where the overlap begins and ends. Rather, it typically provides an estimation of the beginning of the overlap within about +/−two symbols or 24 data bits. This discrepancy can be caused by the phase/frequency error that is due to varying physical write operations. As discs spin at different speeds, an actual write operation can take place away from the ideal targeted location. Typically, this error is about +/−two symbols or 24 data bits. Thus, one needs to fine tune the initial coarse alignment in order to determine the actual alignment of overlap between two data fragments on different tracks.

Figure 5:
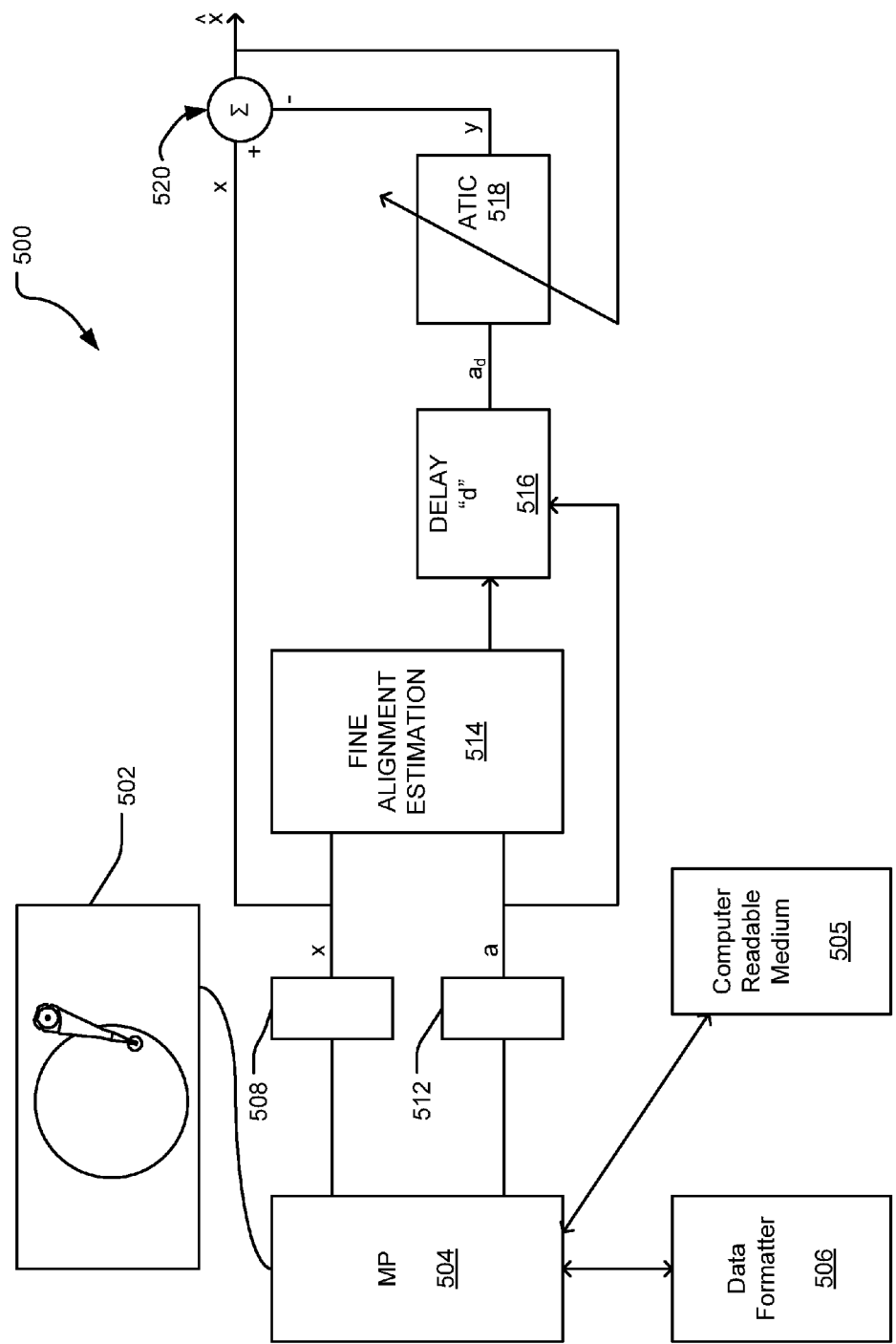
FIG. 5 illustrates a block diagram for a circuit to correct adjacent track interference in accordance with one embodiment.

FIG. 5 illustrates an example of a circuit 500 that can be utilized for the fine tuning process. FIG. 5 shows a disc drive unit 502 that houses a disc that can store data. When data is corrupted due to overlapping tracks, for example, the circuit may be used to correct the corrupted data. A microprocessor 504 may be used to coordinate the retrieval and storage of data as well as to perform the mathematical operations used to recover data signals. Microprocessor 504 is shown in FIG. 5 as external to the drive unit 502 merely for purposes of more clearly illustrating this embodiment. The elements in FIG. 5 could be housed in the disc drive unit. A data formatter 506 may be used, as well. The data formatter 506 can be used to record the positions of data fragments for each track that are stored on the magnetic disc medium as well as the length of each data fragment. Alternatively, the microprocessor 504 can perform the function of the data formatter 506.

The microprocessor 504 can coordinate the storage of data that is read from the magnetic disc medium. For example, FIG. 5 shows that the microprocessor 504 can store data that is read from a first track of the disc in computer memory buffer 508. For purposes of this example, that data is referred to as main track data. Similarly, data read from an overlapping track of the disc may be stored in computer memory buffer 512. This data is often referred to as adjacent track data.

As explained above, a coarse determination can be performed to identify portions of the main and adjacent track that are believed to overlap. That coarse determination can be performed by the microprocessor 504. Alternatively, the coarse determination might be performed by the data formatter 506 if the data formatter has processing capabilities. Data from the main and adjacent tracks can be read from the disc and stored in buffers 508 and 512, respectively. Using the values from the coarse overlap determination, the data values from the main and adjacent track can be successively output from the buffers 508 and 512 as streams of data in coarse alignment. Function block 514 determines a delay value that fine tunes the actual overlap boundaries so that one can select the appropriate interfering signal from the overlapping track in order to perform a correction. Function block 514 can be performed by microprocessor 504 but is shown as a separate function block for purposes of illustration. The output of function block 514 is a delay value, "d", 516.

The fine alignment estimation of block 514 is based on cross-correlating the equalized samples read from the main track and the NRZ bits read from the adjacent track. The cross-correlation peak location with respect to the center gives the delay value "d." The initial fine alignment can be performed over a short window after the adjustment for coarse alignment is made. The cross-correlation function samples near the peak also provide a good estimate of an initial cancellation filter.

Block 516 shows that the delay value "d" is used to adjust the stream of values output by the buffer 512. For example, if the value "d" indicates that the stream from buffer 512 should be delayed by 10 data bits due to correct for phase/frequency variation and thus to achieve a correct correspondence for overlapping data, then the bit stream output from block 516 can be delayed by 10 bits.

Block 518 shows that an adaptive filter may also be used. The adaptive filter may be used to address aberrations caused by phase and frequency inconsistencies in how data was written to a particular track in the downtrack direction. For example, data values written to a track that are targeted for a particular location can vary from that targeted location due to phase and frequency errors during the write process. During the process of writing a sequence of data to a track, there can be variation in spacing of data bits along the track as well. The adaptive filter also can change the amplitude of a signal read from a track in order to account for crosstrack variations. In order to perform the interference cancellation, first, a fine alignment is performed between the equalized signal from the first track and the NRZ bits from the second track. The aligned NRZ bits are then applied to the filter, whose output represents an estimation of the interference, which may be subtracted (cancelled) from the equalized signal to give an interference-free signal.

Once the adaptive filter has determined a correction value "y", the correction value "y" can be utilized to cancel the interference of the adjacent track from the main track. The summation symbol 520 in FIG. 5 represents that the output of the adaptive filter 518 may be used to cancel the interference in equalized sample value "x" of the main track. This produces "x-hat" as the output. The "x-hat" value may be fed back to the adaptive filter 518 as a feedback value. Moreover, "x-hat" may also be re-written over the corrupted data location on the disc so that subsequent reads may be read correctly. And, "x-hat" may be passed to the function that is actually trying to retrieve the value from the disc.

In accordance with one embodiment for the adaptive filter, the taps for the filter ($f_k$) can be updated or adjusted according to the following relationship:

$$f_{k+1} = f_k + \mu(-\partial J)(f)/\partial f)|_{f=f_k} \qquad \text{Equation (1).}$$

This equation can be restated as:

$$f_{k+1} = f_k + \mu e_k a_k \qquad \text{Equation (2).}$$

In the above equations, "$\mu$" is a parameter called adaptation step size, which is selected to speed up or slow down the tracking depending on the rate of variation of the frequency offset. The function J(f) represents the MMSE criterion of the filter. The parameter $e_k$ represents the error between the equalized signal of the first track and the interference canceller's output. The vector $a_k$ represents the data values being input to the filter. The aforementioned taps $f_k$ being initialized using the cross-correlation used in the fine alignment, are adjusted for each data sample at time k, using the above expression.

Figure 6:
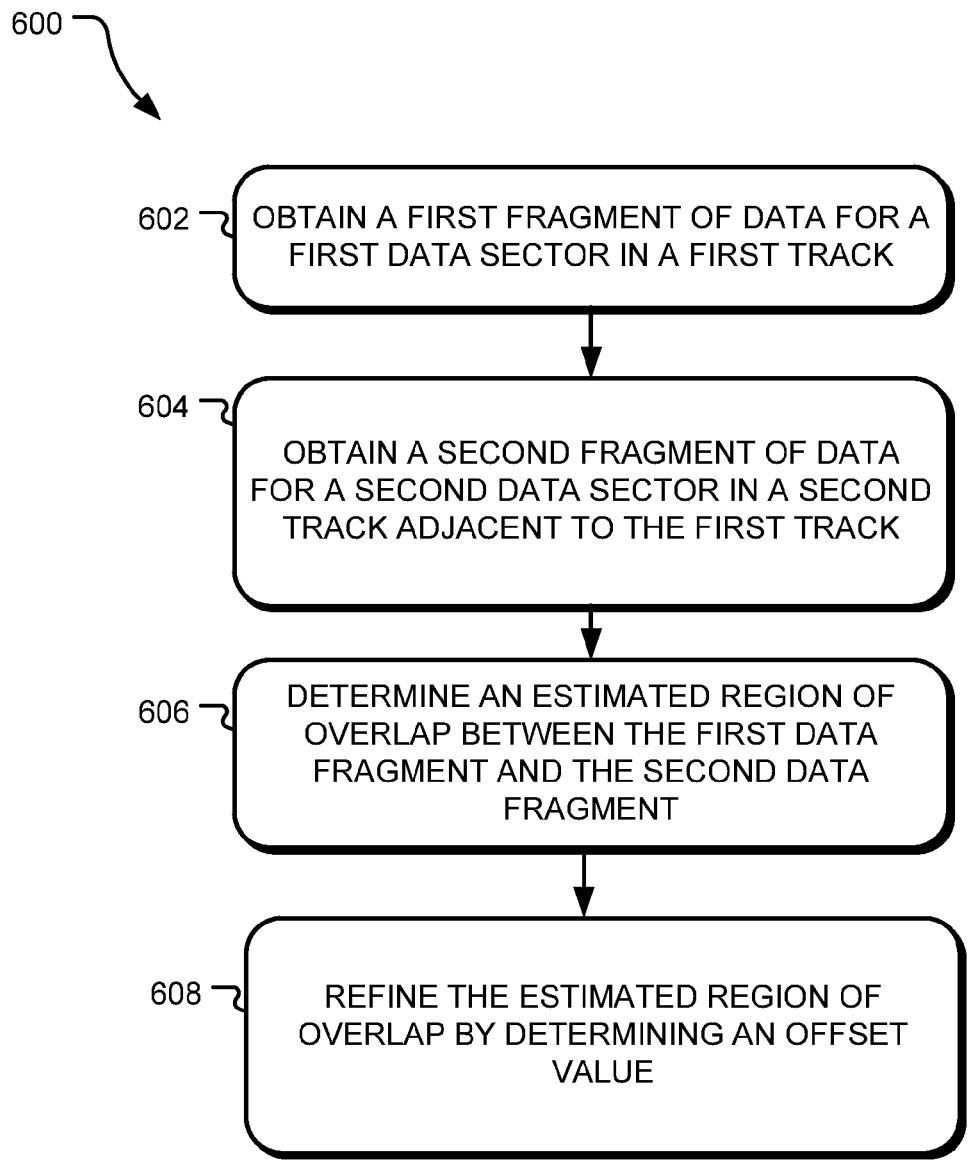
FIG. 6 shows a flow chart that illustrates a method of refining the determination of where overlapping data fragments occur in adjacent data tracks, in accordance with one embodiment.

Referring now to FIG. 6, an example can be seen in accordance with one embodiment. FIG. 6 shows a flow chart 600. In operation block 602, a first data fragment can be obtained. The first data fragment is for a first data sector in a first track of a magnetic storage medium. In block 604, a second data fragment can be obtained. An estimated region of overlap can be determined, as shown in block 606. This estimated region of overlap may then be refined by determining an offset value, e.g. a "fine tune" offset value. The offset value may be used to adjust the estimated beginning portion of overlap by the second fragment, for example.

Figure 7A:
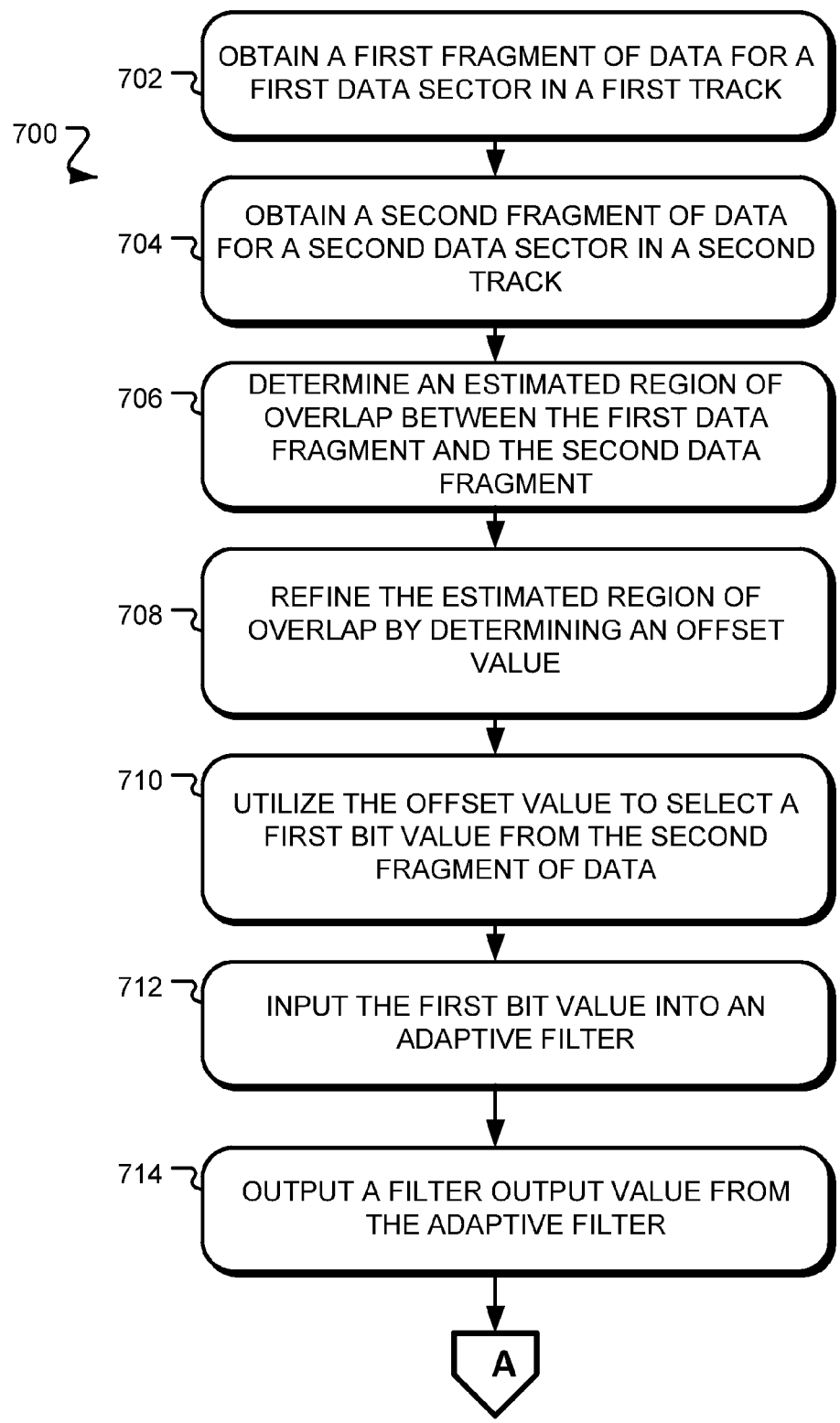
FIGS. 7A and 7B show a flow chart that illustrates a method of cancelling interference caused by neighboring data tracks, in accordance with one embodiment.
Figure 7B:
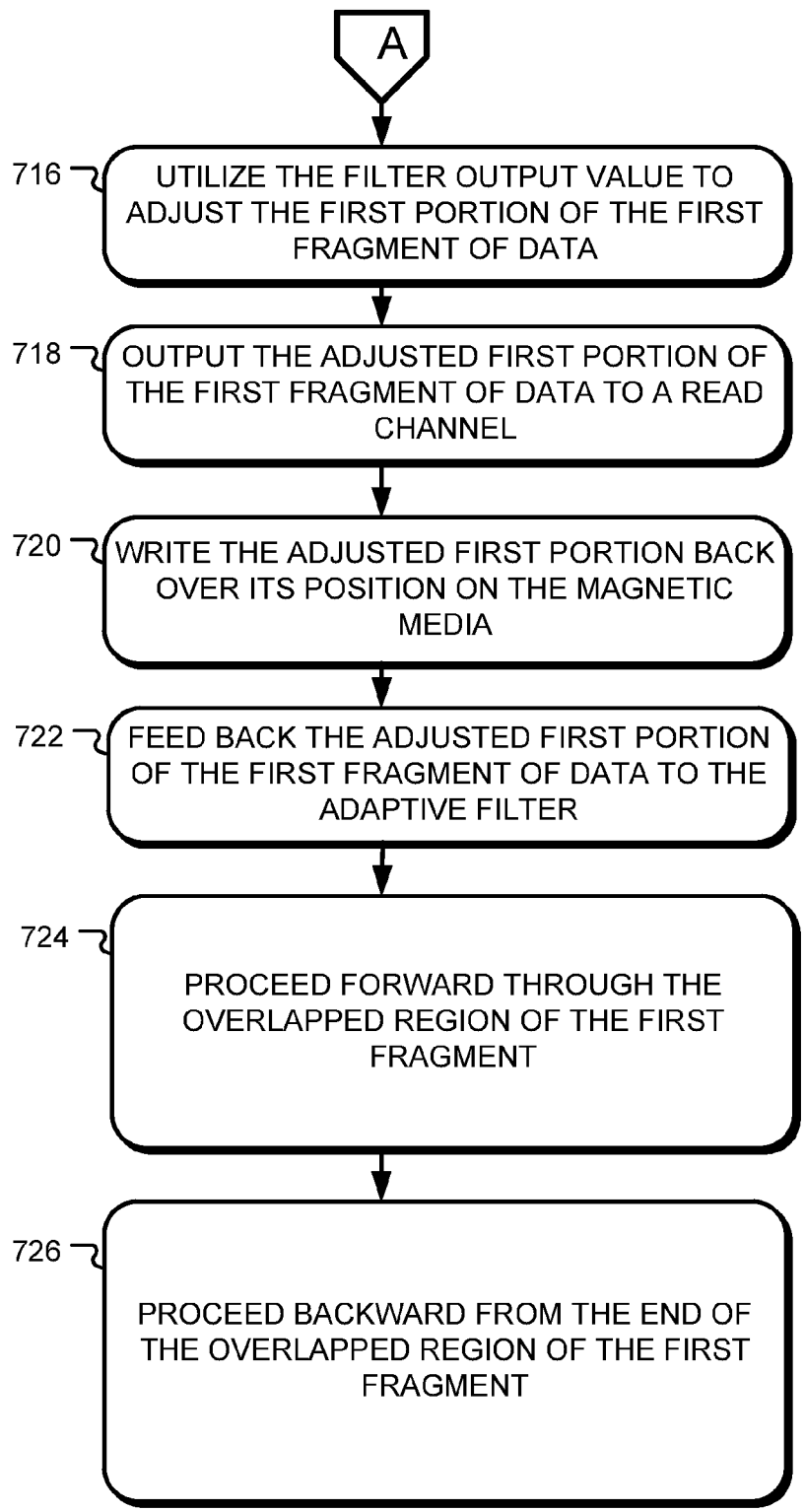

FIGS. 7A and 7B illustrate a more detailed example. In operation block 702, a first fragment of data for a first data sector in a first track of a magnetic medium is obtained. Similarly, block 704 shows that a second fragment of data for a second data sector in a second track of the magnetic storage medium is obtained. The second track is an adjacent track in this example.

In block 706, a determination can be made of the estimated region of overlap between a first data fragment and a second data fragment. The estimated region of overlap can be refined, as shown by operation block 708. This can be done by determining an offset value. The offset value can offset the estimated beginning position of overlap by the second fragment. This offset value may be used, as shown in block 710, to select a first bit value from the second fragment of data that overlaps the first portion of the first fragment of data. This value can be input into an adaptive filter as shown in block 712. The adaptive filter can output a filter output value 714. For example, the output value may be adjusted in amplitude.

In block 716, the adaptive filter output value may be used to adjust the corresponding data value on the corrupted first track. Since the first track is read as sampled data rather than actual NRZ data, this corresponding data is referred to as the first portion of the first fragment of data in the first track for purposes of this example. In block 718, the adjusted first portion of the first fragment can be output to the read channel as part of a read operation. In addition, the adjusted first portion may be written back over its location on the magnetic medium as an NRZ value so that it may be read more readily the next time it is required. This is shown by operation block 720.

A feedback loop may be utilized with the adaptive filter. Thus, block 722 shows that the adjusted value may be fed back as an input value to the adaptive filter.

The adaptive filter will typically achieve better results as it uses more data and receives more feedback. Thus, in accordance with one embodiment, a forward and backward pass can be made through the region of overlapping data, for example. Thus, a first forward pass can be made by proceeding from the beginning of the overlapping region for each bit of the overlapping region, as shown in block 724. Then, a backward pass can be made from the end of the overlapping region towards the beginning of the overlapping region, as shown by block 726. Values initially determined at the beginning of the forward pass when little feedback was available can be corrected further based on the backward pass. The recovered data may then be stored or used at that point. Alternatively, one could process data from the end of the overlapping regions first and then reverse the process. This alternative approach would effectively be a backward pass followed by a forward pass.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

What is claimed is:

1. A method comprising:
   obtaining a first fragment of data for a first data sector in a first track of a storage medium;
   obtaining a second fragment of data for a second data sector in a second track of the storage medium adjacent to the first track;
   determining an estimated region of overlap between the first data fragment and the second data fragment; and
   refining the estimated region of overlap by determining an offset value via cross-correlation to offset an estimated beginning portion of overlap by the second fragment.

2. The method of claim 1 and further comprising:
   utilizing the offset value to select a first bit value from the second fragment of data that overlaps a first portion of the first fragment of data; and
   inputting the first bit value into an adaptive filter.

3. The method of claim 2 and further comprising:
   outputting a filter output value from the adaptive filter; and
   utilizing the filter output value to adjust the first portion of the first fragment of data.

4. The method of claim 3 wherein the filter output value is subtracted from the first portion of the first fragment of data.

5. The method of claim 3 and further comprising:
   feeding back the adjusted first portion of the first fragment of data to the adaptive filter.

6. The method of claim 1 and further comprising:
   proceeding forward through the refined region of overlap so as to determine an adjusted bit value for each bit of the overlapped region of the first fragment; and
   proceeding backward from the end of the refined region of overlap so as to determine an adjusted bit value for each bit of the overlapped region of the first fragment.

7. The method of claim 3 and further comprising:
   determining an adjusted bit value for each overlapping data bit in the overlapping region.

8. The method of claim 1 and further comprising, prior to the first obtaining step:
   determining a starting position and length for the first fragment;
   determining a starting position and length for the second data fragment;
   determining adjacent coextensive portions of the first fragment and the second fragment; and
   reading the adjacent coextensive portions of the first fragment and the second fragment.

9. A system comprising:
   a first buffer storing a first data fragment for a first data sector in a first track of a storage medium;
   a second buffer storing a second data fragment for a second data sector in a second track of the storage medium adjacent to the first track;
   a processor configured to determine an estimated region of overlap between the first data fragment and the second data fragment; and
   a circuit configured to refine the estimated region of overlap by determining an offset value via cross-correlation to offset an estimated beginning portion of overlap by the second fragment.

10. The system of claim 9 and further comprising a delay circuit configured to:
    receive as an input the second data fragment from the second buffer;
    receive the offset value as an input; and
    output a first bit value from the second data fragment that overlaps a first portion of the first data fragment.

11. The system of claim 10 and further comprising an adaptive filter configured to:
   receive as an input a value derived from at least the second data fragment; and
   output an adjusted first portion of the first data fragment as a filter output value.

12. The system of claim 11 and further comprising:
   a cancellation circuit, wherein the filter output value is subtracted from the first portion of the first data fragment.

13. The system of claim 11 wherein the first portion of the first data fragment is an equalized sample data value.

14. The system of claim 11 wherein the processor is further configured to determine a coarse alignment by:
   determining a starting position and length for the first and second data fragments; and
   determining and reading adjacent coextensive portions of the first and second data fragments.

15. The system of claim 11 and further comprising:
   a feedback circuit to feed back the adjusted first portion of the first data fragment to the adaptive filter.

16. The system of claim 15 wherein:
   the adaptive filter is configured to determine an adjusted bit value for each bit of the overlapped region of the first fragment proceeding forward through the overlapped region of the first fragment; and
   wherein the adaptive filter is configured to determine an adjusted bit value for each bit of the overlapped region of the first fragment proceeding backward from the end of the overlapped region of the first fragment.

17. The system of claim 11 wherein the adaptive filter is configured to determine an adjusted bit value for each overlapping data bit in the overlapping region.

18. A method comprising:
   determining a starting position and length for a first data fragment located in a first track of a recording medium;
   determining a starting position and length for a second data fragment located in a second track of the recording medium;
   determining adjacent coextensive portions of the first data fragment and the second data fragment;
   estimating the adjacent coextensive portions of the first data fragment and the second data fragment; and
   estimating a fine alignment of the adjacent coextensive portions by determining an offset value via cross-correlation to offset an estimated beginning portion of overlap by the second fragment.

19. The method of claim 18 and further comprising:
   utilizing the offset value to select a first bit value from the second data fragment that overlaps a first portion of the first data fragment; and
   inputting the first bit value into an adaptive filter.

20. The method of claim 19 and further comprising:
   outputting a filter output value from the adaptive filter; and
   utilizing the filter output value to adjust the first portion of the first data fragment.

\* \* \* \* \*